United States Patent
Warlick

(10) Patent No.: US 6,668,856 B2
(45) Date of Patent: Dec. 30, 2003

(54) VALVE WITH GUIDED BALL

(75) Inventor: Tim Warlick, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 71 days.

(21) Appl. No.: 10/043,985

(22) Filed: Jan. 10, 2002

(65) Prior Publication Data

US 2003/0127140 A1 Jul. 10, 2003

(51) Int. Cl.[7] ............................................... F16K 15/04
(52) U.S. Cl. .................... 137/533.17; 137/539; 239/572
(58) Field of Search ...................... 137/533.11, 533.17, 137/535, 539, 540, 541, 542; 239/572, 571, 570

(56) References Cited

U.S. PATENT DOCUMENTS

| 4,317,467 A | | 3/1982 | Heyland |
| 4,365,648 A | * | 12/1982 | Grothe ........................ 137/539 |
| 4,462,760 A | | 7/1984 | Sarich et al. |
| 4,893,650 A | | 1/1990 | Chisholm et al. |
| 4,958,656 A | | 9/1990 | Patel |
| 5,024,193 A | | 6/1991 | Graze, Jr. |
| 5,129,423 A | | 7/1992 | Fournier et al. |
| 5,183,075 A | | 2/1993 | Stein |
| 5,299,598 A | | 4/1994 | Quartana, III et al. |
| 5,501,242 A | | 3/1996 | Coutts et al. |
| 5,586,579 A | | 12/1996 | Diehl |
| 5,664,603 A | | 9/1997 | Knapp |
| 5,713,390 A | | 2/1998 | Huang |
| 5,782,269 A | | 7/1998 | Seaney et al. |
| 5,967,180 A | | 10/1999 | Yates, III |
| 6,047,907 A | | 4/2000 | Hornby |
| 6,105,884 A | * | 8/2000 | Molnar et al. ...... 137/625.33 X |
| 6,142,394 A | | 11/2000 | Hefler et al. |
| 6,145,805 A | | 11/2000 | Smith, III et al. |
| 6,206,032 B1 | | 3/2001 | Hill |

\* cited by examiner

Primary Examiner—Kevin Lee
(74) Attorney, Agent, or Firm—Leydig, Voit & Mayer, Ltd.

(57) ABSTRACT

A guided ball check valve in which the ball is guided to prevent radial wander. The guided ball valve comprises a valve housing having a cylindrical bore. A conical valve seat is provided at a first end of the cylindrical bore. Axial grooves are formed into the cylindrical wall of the bore to provide means for the passage of fluid through the check valve when open. A spherical ball slides in the cylindrical bore between a closed position in which the spherical ball is seated against the conical valve seat and an open position in which a gap is formed between the spherical ball and the conical valve seat. The spherical ball has diameter substantially equivalent to that of the cylindrical bore such that the cylindrical wall of the bore engages and guides the spherical ball as the spherical ball linearly translates between open and closed positions.

17 Claims, 5 Drawing Sheets

VALVE WITH GUIDED BALL

FIELD OF THE INVENTION

The present invention relates generally to valves, and more particularly relates to check valves and/or pressure relief valves.

BACKGROUND OF THE INVENTION

Check valves are used in a wide range of fluid applications for preventing fluid flow from reversing in a fluid passageway. Often times, manufacturers choose to incorporate check valves that use a spherical ball as the movable valve element due to the fact that the balls in these valves are inexpensive and simple. However, such a selection has often been at the sacrifice of durability of the conical valve seat against which the ball seats in the closed position to prevent fluid flow. Specifically, in existing ball valves, the ball tends to wander radially as it linearly reciprocates within the enlarged bore of the valve housing. This causes the ball to impact the conical valve seat at different radial points which causes increased wear and/or indents in the valve seat that in turn can cause leakage. This is especially evident on applications like gas inlet check valves used on natural gas engines with precombustors.

BRIEF SUMMARY OF THE INVENTION

In light of the above, it is a general aim of the present invention to provide an inexpensive and durable check valve that overcomes the difficulties existing in the art.

In accordance with these and other objectives, the invention is directed toward a guided ball check valve in which the ball is guided by the bore to prevent radial wander. The guided ball valve comprises a valve housing having a bore. A valve seat is provided at a first end of the bore. Axial grooves or flow channels are provided in the guide wall of the bore to provide means for the passage of fluid through the check valve when open. A spherical ball slides in the bore between a closed position in which the spherical ball is seated against the valve seat and an open position in which a gap is formed between the spherical ball and the valve seat. The spherical ball has diameter substantially equivalent to that of the bore such that the guide wall of the bore engages and guides the spherical ball as the spherical ball linearly translates between open and closed positions.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
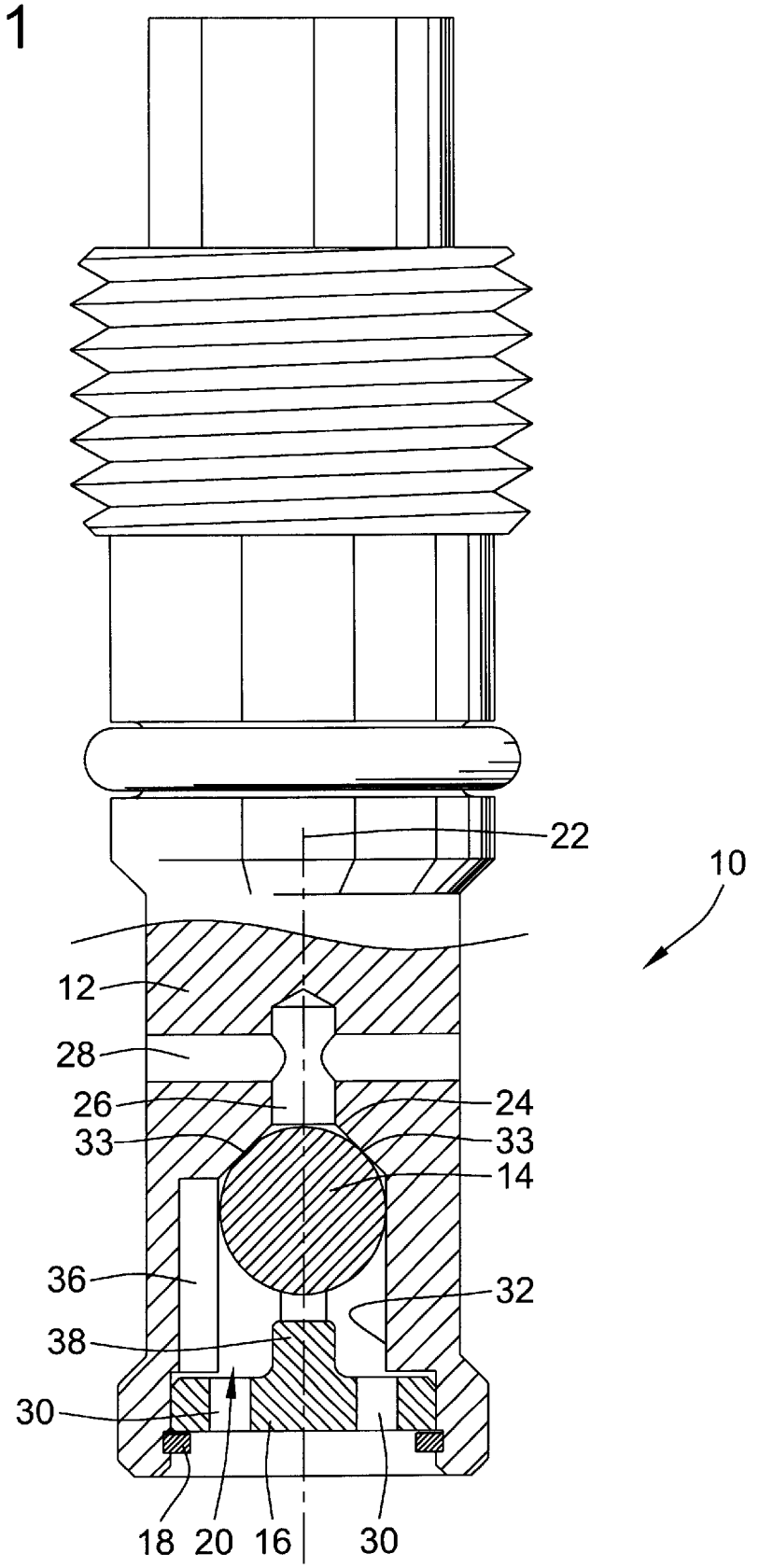
FIG. 1 is a cross section of a check valve according to a preferred embodiment of the present invention in an closed position.
Figure 2:
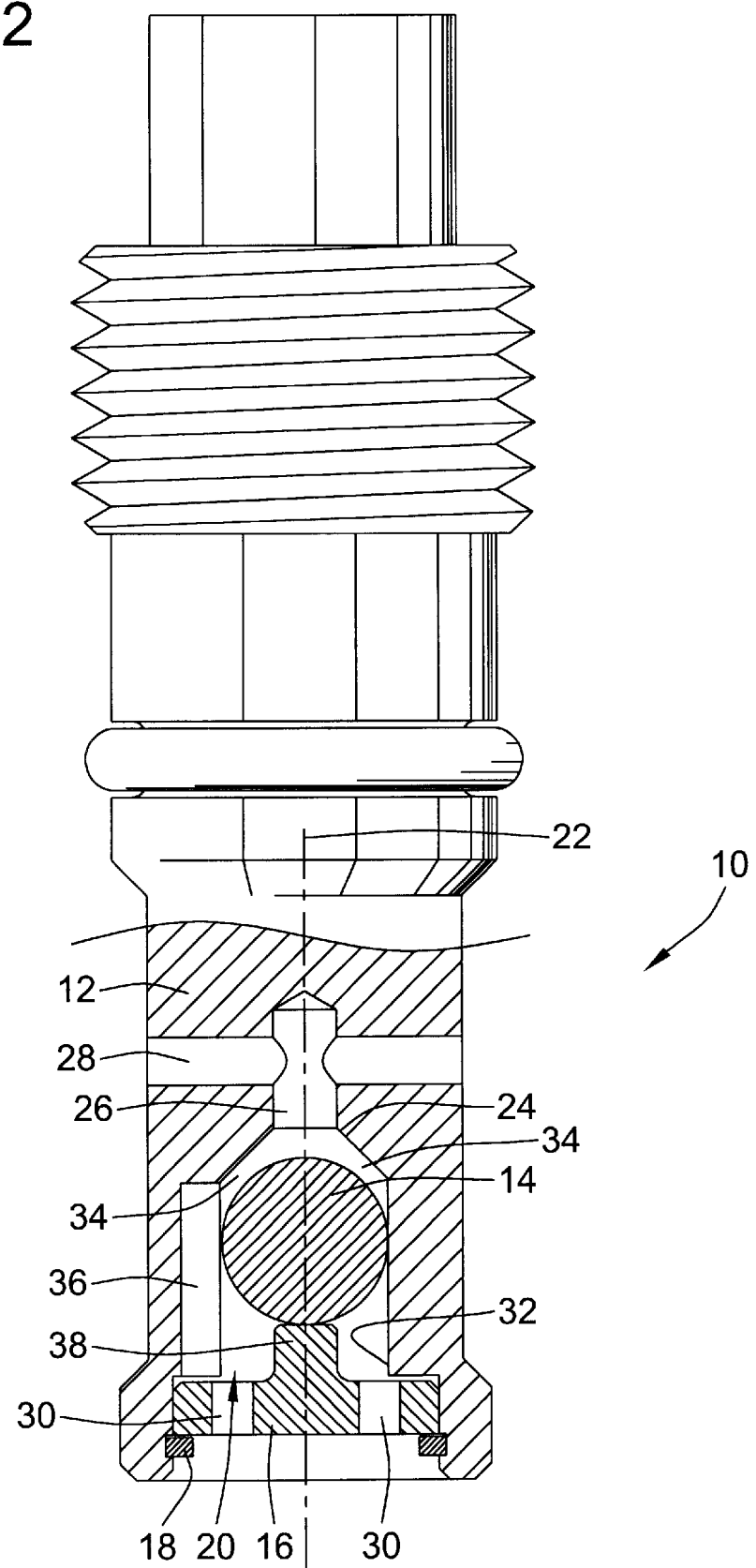
FIG. 2 is the same view of the check valve as FIG. 1 but in a open position.
Figure 3:
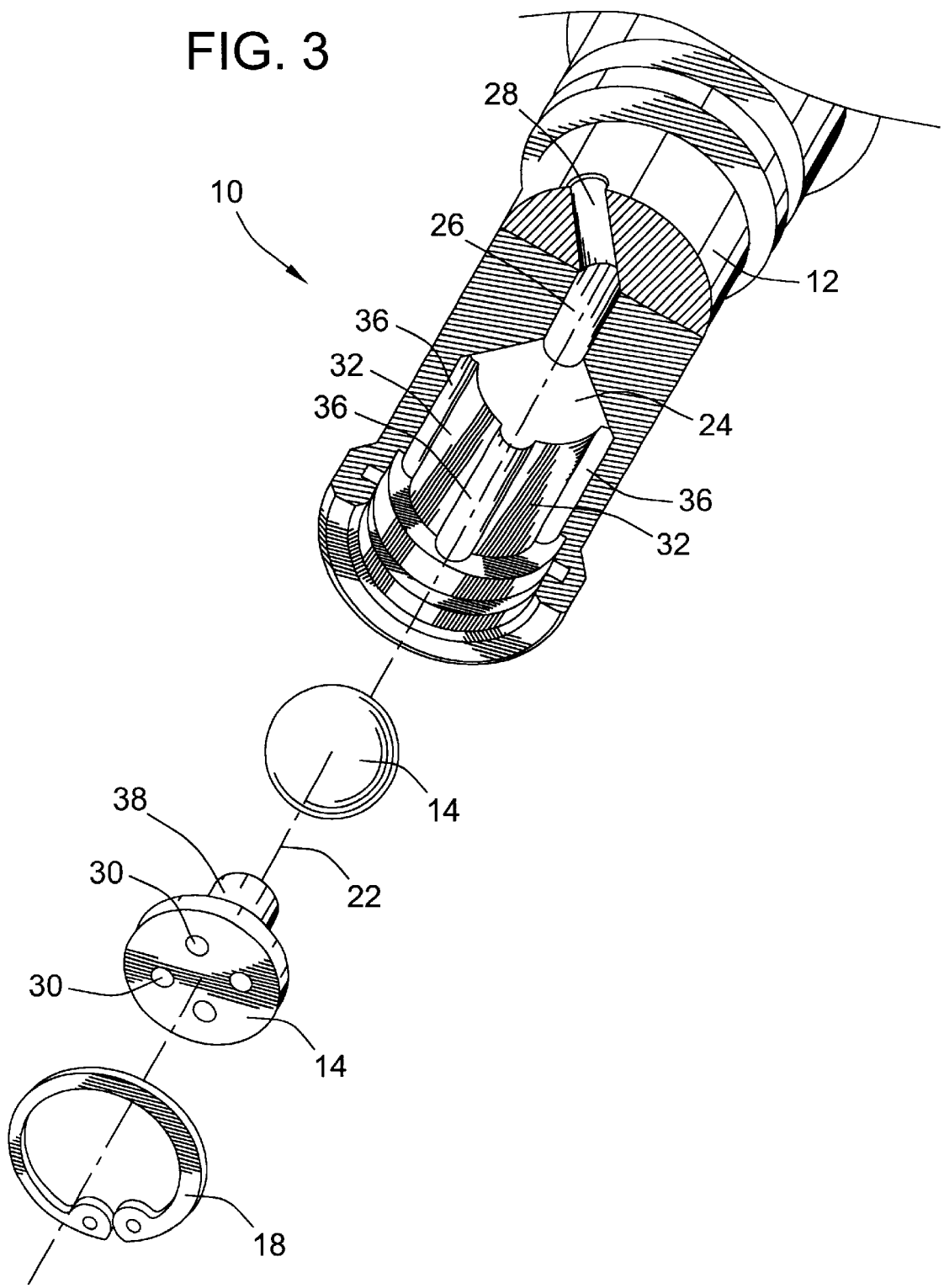
FIG. 3 is an exploded isometric view of the check valve illustrated in FIG. 1.

Referring to FIGS. 1 and 2, a check valve 10 is illustrated in accordance with a preferred embodiment of the present invention. In the disclosed embodiment, the check valve 10 includes a valve housing 12, a spherical ball 14, a stop plate 16 and a snap ring 18.

The valve housing 12 defines a cylindrical bore 20 that is coaxial about a valve axis 22. A radiused or conical valve seat 24 is provided at one end of the bore 20. A central hole or fluid port 26 extends through the center of the valve seat 24 to connect the bore 20 with a fluid passage 28. The snap ring 18 secures the stop plate 16 to valve housing 12 at the other end of the bore 20 to trap the spherical ball 14 inside the bore 20. The stop plate 16 is perforated, having radial fluid ports 30 to allow fluid flow therethrough. As an alternative to the snap ring 18, the plate 16 may be screwed to the housing 12 for retention or otherwise secured by other such retainers.

The spherical ball 14 linearly translates within the bore 20 between the stop plate 16 and the conical valve seat 24 to provide closed and open positions for the check valve 10. In the closed position, the ball 14 is seated against the valve seat 24 along a circular contact 33. In accordance with the present invention, the disclosed embodiment guides the linear movement of the ball 14 with the inner cylindrical wall 32 of the bore 20. In particular, the diameter of the wall 32 is substantially equal to the diameter of the spherical ball 14. In this manner, the wall 32 engages and guides the ball 14 preventing radial movement or wander during linear movement, and thereby better ensure that initial contact between the ball 14 and valve seat 24 occurs along the circular contact 33. With manufacturing tolerances and clearance considerations, the diameter of the ball 14 is just less that the diameter of the cylindrical wall 32 by typically under 1 millimeter, and preferably between 0.1 and 0.2 millimeters, for most types of valves. However, for larger valves in other applications, the diameter of the ball 14 may be smaller than the diameter cylindrical wall 32 by more than 1 millimeter. The actual amount of clearance between the ball and the bore thus depends upon valve size and can be in a range between 2% and 12% of the diameter of the ball.

In the open position, the ball 14 is abutted up against the stop plate 16 with a gap 34 between the valve seat 24 and the ball 14 to allow fluid to enter the bore 20. Because of the tight clearance between the wall 32 and the ball 14 no substantial fluid flow occurs between the ball 14 and the cylindrical wall 32. The stop plate 16 may include an axially projecting stem 38 coaxial about the axis 22 for engaging the center of the ball 14. To provide for fluid flow past the ball 14 and in keeping with the invention, axial grooves 36 are formed into the cylindrical wall 32 at angular intervals about the axis 22. In the disclosed embodiment four grooves 36 are provided although more or less could also be used. The grooves 36 provide a flow path for mass amounts of fluid past the ball 14, the total flow area of the grooves is not less than and preferably greater than the mass flow area of the fluid port 26 and/or radial fluid ports 30 so as not to act as a fluid restriction.

An further advantage of the disclosed embodiment is that the radial flow channels or grooves 36 allow for large amounts of fluid flow when the valve is open with very little ball travel. The amount of ball travel may be set by the axial length of the axially projecting stem 38 of the stop plate 16. The small ball travel reduces the ball velocity and therefore impact against the valve seat 24 thus reducing the resulting stress which can cause the valve seat to "spalling" or form pits customarily due to a metal fatigue type failure. The reduced travel also reduces ball impact against the stop plate 16 thereby reducing wearing and fatigue in the material of the ball 14.

Figure 4:
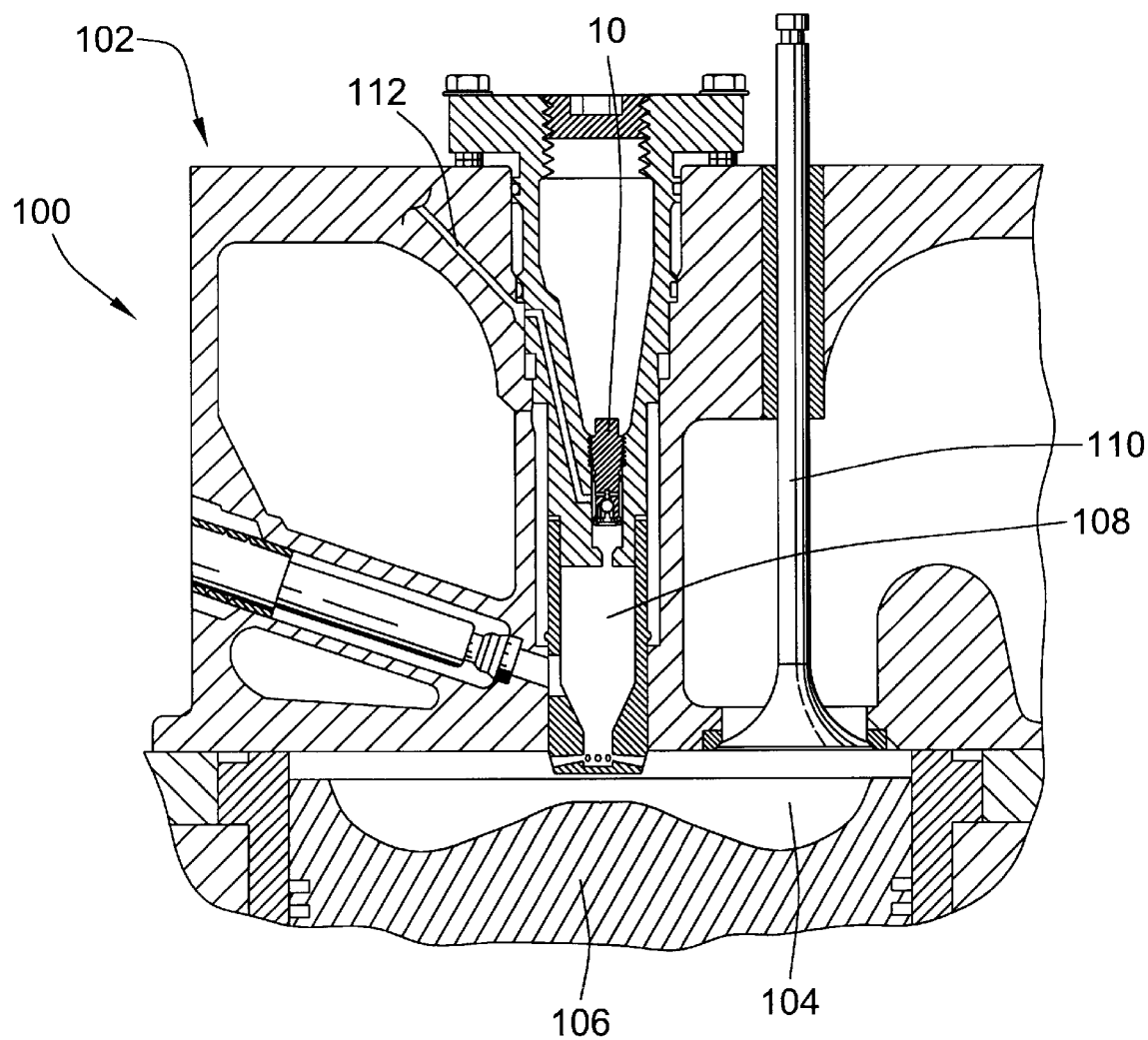
FIG. 4 is a cross section of the check valve illustrated in FIG. 1 as installed in a fuel combustion system.

The disclosed embodiment has improved durability and reliability in check valve assemblies for precombustors in gas engine fuel systems where durability issues have long existed. The invention thus also extends to this particular application as illustrated in FIG. 4, although other applications are envisioned and are hereby reserved for the assignee of the invention. For example, the valve may also be used for hydraulic applications (e.g. such as load regulating devices that have hydraulic oil at very high pressures).

Referring to FIG. 4, the check valve 10 is installed in a fuel combustion system 100 for a gas engine 102. Except for the novel check valve 10, the engine 102 is not new and further details of the exemplary engine 102 as illustrated can be had to U.S. Pat. No. 5,024,193 to Graze, Jr., the entire disclosure of which is hereby incorporated by reference. Suffice to say, the engine 102 includes a main combustion chamber 104 above a reciprocating piston 106 and a pre-combustion chamber 108 in communication therewith. The main combustion chamber 104 has inlet and outlet valves 110 (only one being illustrated but it will be understood that there are typically two or four valves about the piston axis) for admitting a combustible fuel mixture and for exhausting combusted gases. The precombustion chamber 108 is in communication with a fuel passage 112 that supplies gaseous fuel for precombustion. The check valve 10 is interposed between the precombustion chamber 108 and the fuel passage 112 and serves the purpose of preventing gases from the precombustion chamber 108 from reversing and flowing back through the fuel passage 112. The general operation of the engine 102 will be understood by one skilled in the art and as such further detail need not be disclosed herein.

One particular advantage of the valve 10 as applied to precombustors as shown in FIG. 4 is that the reduce ball travel allow the pressure to be regulated more precisely thereby improving control because the valve 10 cycles from the close position to the open position and back to the closed position very quickly (In contrast, with a long ball travel, the pressure may drop significantly because the ball cycle time is long).

Figure 5:
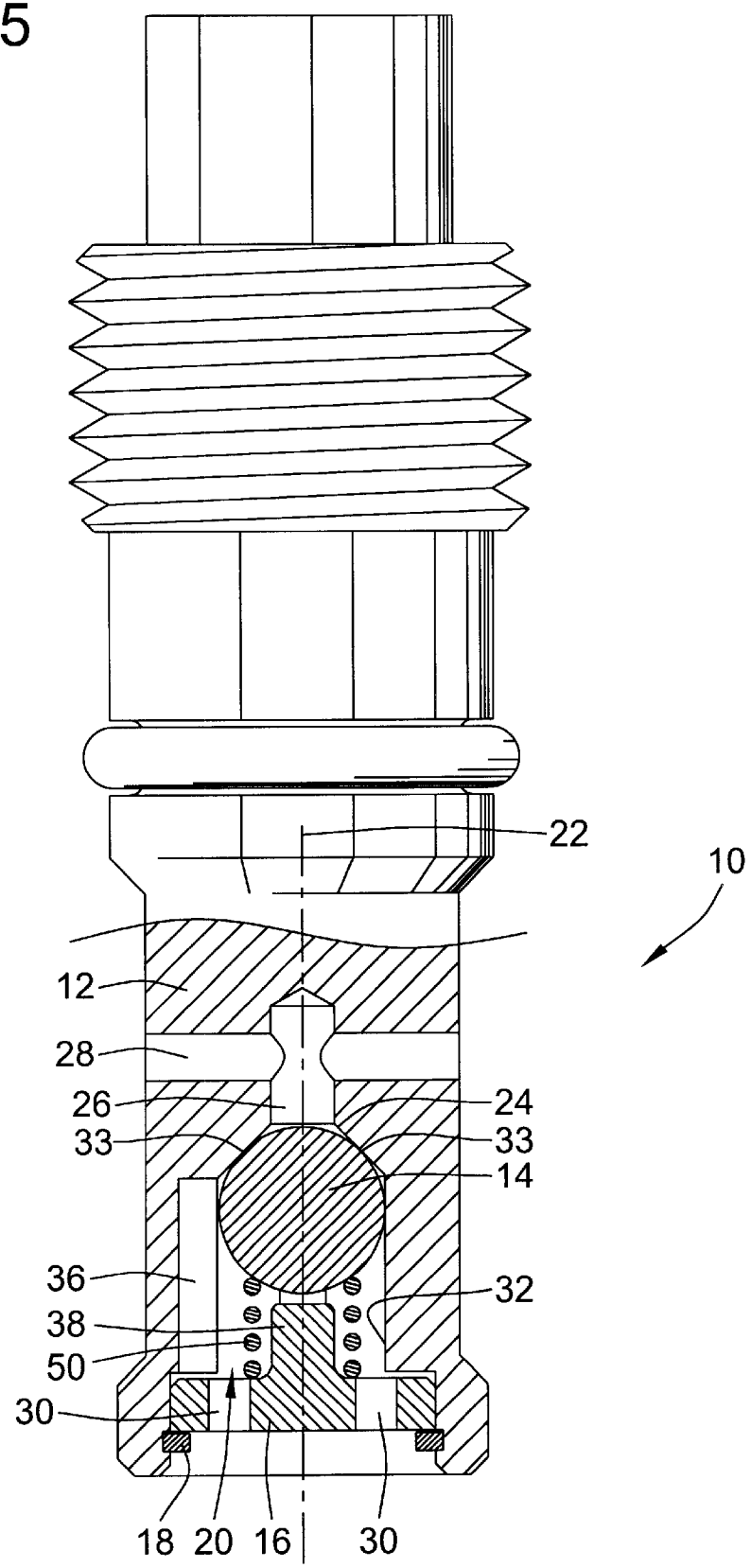
FIG. 5 is a cross section of a check valve according to an alternative embodiment of the present invention.

Referring to FIG. 5, it will also be appreciated that a spring 50 may be used to bias the ball 14 against the valve seat 24. The spring 50 is a coil spring that can be installed over and retained by the axially project stem 38 of the stop plate 16. The spring 50 keeps the ball 14 in the closed position until a predetermined fluid pressure differential is present across the ball 14. Thus the invention is also applicable to biased check valves or pressure relief valves.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A guided ball valve, comprising:
   a valve housing having a bore, the bore having a cylindrical guide wall of a first diameter surrounding an axis, the valve housing having a valve seat at a first end of the bore radially about the axis, the seat and the cylindrical guide wall being unitary with each other;
   at least one flow channel formed into the guide wall extending axially along the bore; and
   a spherical ball sliding in the bore between a closed position in which the spherical ball is seated against the valve seat and an open position in which a gap is formed between the spherical ball and the valve seat, the spherical ball having a second diameter substantially equivalent to the first diameter wherein the guide wall engages and guides the spherical ball as the spherical ball linearly translates between open and closed positions.

2. The guided ball valve of claim 1 wherein at least two of said flow channels are formed into the guide wall, the flow channels being spaced at angular intervals about the axis.

3. The guided ball valve of claim 1 further comprising a stop plate secured to the valve housing at a second end of the bore, the spherical ball being contained between the stop plate and the valve seat, the valve seat being generally conical.

4. The guided ball valve of claim 3 wherein the plate includes at least one through-port for conveying fluid therethrough.

5. The guided ball valve of claim 3 wherein the stop plate integrally includes a central stem projecting axially within the bore coaxial with the axis, the central stem adapted to engage the spherical ball while in the open position.

6. The guided ball valve of claim 5 further comprising a spring coaxial about the central stem urging the spherical ball against the valve seat.

7. The guided ball valve of claim 1 wherein the second diameter is less than the first diameter by between 2% and 12% of the second diameter.

8. The guided ball valve of claim 7 wherein the second diameter is less than the first diameter by between 0.1 and 0.2 millimeter.

9. The invention of claim 3, further comprising a retaining ring securing the stop plate to the valve housing.

10. In a fuel combustion system for a engine defining a main combustion chamber above a reciprocating piston and a precombustion chamber in communication therewith, the main combustion chamber having an inlet valve for admitting a combustible fuel mixture and an outlet valve for exhausting combusted gases, the precombustion chamber in communication with a fuel passage, wherein the improvement comprises an improved guided ball valve interposed between the precombustion chamber and the fuel chamber, the guided ball valve comprising:

a valve housing having a bore, the bore having a cylindrical guide wall of a first diameter surrounding an axis, the valve housing having a valve seat at a first end of the bore radially about the axis the seat and the guide wall being unitary with each other;

at least one flow channel formed into the guide wall extending axially along the bore; and a spherical ball sliding in the bore between a closed position in which the spherical ball is seated against the valve seat and an open position in which a gap is formed between the spherical ball and the valve seat, the spherical ball having a second diameter substantially equivalent to the first diameter wherein the guide wall engages and guides the spherical ball as the spherical ball linearly translates between open and closed positions.

11. The invention of claim 10 wherein at least two of said flow channels are formed into the guide wall, the flow channels being spaced at angular intervals about the axis.

12. The invention of claim 10 wherein the second diameter is less than the first diameter by between 2% and 12% of the second diameter.

13. The invention of claim 10 wherein the second diameter is less than the first diameter by between 0.1 and 0.2 millimeter.

14. In a fuel combustion system for a engine defining a main combustion chamber above a reciprocating piston and a precombustion chamber in communication therewith, the main combustion chamber having an inlet valve for admitting a combustible fuel mixture and an outlet valve for exhausting combusted gases, the precombustion chamber in communication with a fuel passage, wherein the improvement comprises an improved guided ball valve interposed between the precombustion chamber and the fuel chamber, the guided ball valve comprising:

a valve housing having a bore, the bore having a guide wall of a first diameter surrounding an axis, the valve housing having a valve seat at a first end of the bore radially about the axis;

at least one flow channel formed into the guide wall extending axially along the bore;

a spherical ball sliding in the bore between a closed position in which the spherical ball is seated against the valve seat and an open position in which a gap is formed between the spherical ball and the valve seat the spherical ball having a second diameter substantially equivalent to the first diameter wherein the guide wall engages and guides the spherical ball as the spherical ball linearly translates between open and closed positions; and comprising a stop plate secured to the valve housing at a second end of the bore, the spherical ball being contained between the stop plate and the valve seat, the valve seat being generally conical.

15. The invention of claim 14, wherein the plate includes at least one through port for conveying fluid therethrough.

16. The invention of claim 14 wherein the stop plate integrally includes a central stem projecting axially within the bore coaxial with the axis, the central stem adapted to engage the spherical ball while in the open position.

17. The invention of claim 16 further comprising a spring coaxial about the central stem urging the spherical ball against the valve seat.

* * * * *

UNITED STATES PATENT AND TRADEMARK OFFICE
CERTIFICATE OF CORRECTION

PATENT NO. : 6,668,856 B2  
DATED : December 30, 2003  
INVENTOR(S) : Tim Warlick It is certified that error appears in the above-identified patent and that said Letters Patent is hereby corrected as shown below:

Column 5,
Line 4, after "the axis", insert -- , --

Column 6,
Line 13, after "valve seat", insert -- , --

Signed and Sealed this

Second Day of March, 2004

JON W. DUDAS
*Acting Director of the United States Patent and Trademark Office*